US008891184B2

(12) United States Patent
Feygin

(10) Patent No.: US 8,891,184 B2
(45) Date of Patent: Nov. 18, 2014

(54) METHOD AND APPARATUS FOR OPTICALLY-ENHANCED COOLING

(75) Inventor: Ilya Feygin, Mountainside, NJ (US)

(73) Assignee: TechElan, LLC, Mountainside, NJ (US)

( * ) Notice: Subject to any disclaimer, the term of this patent is extended or adjusted under 35 U.S.C. 154(b) by 3043 days.

(21) Appl. No.: 10/442,381

(22) Filed: May 21, 2003

(65) Prior Publication Data

US 2004/0233549 A1    Nov. 25, 2004

(51) Int. Cl.
| G02B 7/02 | (2006.01) |
| G02B 27/14 | (2006.01) |
| G02B 13/14 | (2006.01) |
| G01J 5/08 | (2006.01) |

(52) U.S. Cl.
CPC .. G02B 13/14 (2013.01); G01J 5/08 (2013.01)
USPC .......................................... 359/820; 359/631

(58) Field of Classification Search
USPC ......... 359/820, 350, 355, 356, 351, 361, 357, 359/353, 354, 364, 389, 390, 627, 631, 633, 359/636, 639, 727, 821, 822, 823
See application file for complete search history.

(56) References Cited

U.S. PATENT DOCUMENTS

| 3,694,654 A | * | 9/1972 | Crownover | 250/352 |
| 3,742,124 A | * | 6/1973 | Wilson et al. | 348/33 |
| 3,813,552 A | * | 5/1974 | Johnson | 250/347 |
| 4,253,739 A | * | 3/1981 | Carlson | 359/845 |
| 5,084,621 A | * | 1/1992 | Geiser | 250/353 |
| 5,209,079 A | * | 5/1993 | Kajino et al. | 62/180 |
| 5,264,930 A | * | 11/1993 | Florence et al. | 348/164 |
| 5,271,074 A | * | 12/1993 | Tocci | 385/16 |
| 5,274,235 A | * | 12/1993 | Taylor | 250/332 |
| 5,491,334 A | * | 2/1996 | Gartenberg et al. | 250/227.21 |
| 6,212,210 B1 | * | 4/2001 | Serizawa | 372/32 |
| 6,437,916 B1 | * | 8/2002 | McLeod et al. | 359/499 |
| 2002/0086600 A1 | * | 7/2002 | Ghosh | 442/229 |
| 2003/0016729 A1 | * | 1/2003 | Lee et al. | 374/131 |

OTHER PUBLICATIONS

A First Course in Atmospheric Radiation (2$^{nd}$ Ed.) by Grant W. Petty; 460 pp. (paperback); Sundog Publishing; Publication Date: Mar. 2006, pp. 110-112; http://www.sundogpublishing.com/AtmosRad/Excerpts/AtmosRad110.pdf.*
Merriam-Webster, Incorporated, Merriam-Webster's Collegiate Dictionary, Copyright 1993, Tenth Edition, p. 1332.*

* cited by examiner

*Primary Examiner* — Scott J Sugarman
*Assistant Examiner* — Brandi Thomas
(74) *Attorney, Agent, or Firm* — Kaplan Breyer Schwarz & Ottesen, LLP

(57) ABSTRACT

The illustrative embodiment of the present invention is an apparatus and method that is capable of non-contact cooling of a hot body by optically-enhanced radiation. An apparatus in accordance with the illustrative embodiment includes a cold body and an optical system. The optical system couples the cold body to a hot body for the transmission of infrared radiation. Once optically coupled, heat will flow, at an enhanced rate, from the hot body to the cold body, as dictated by thermodynamics, thereby cooling the hot body. In some embodiment, the temperature of the cold body is held substantially constant.

18 Claims, 3 Drawing Sheets

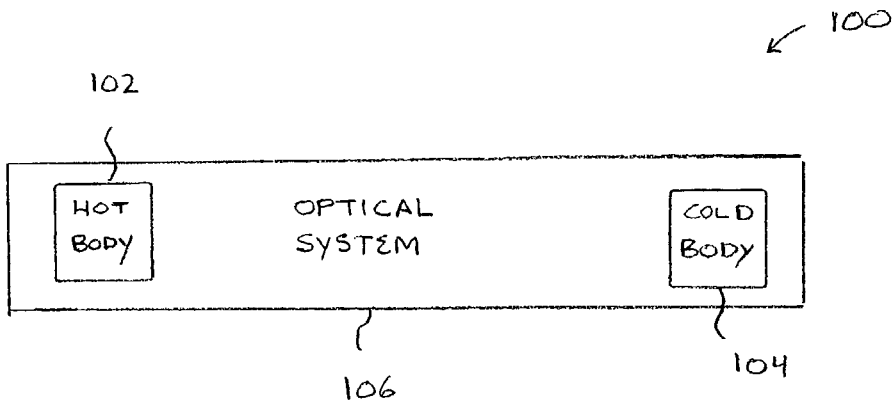
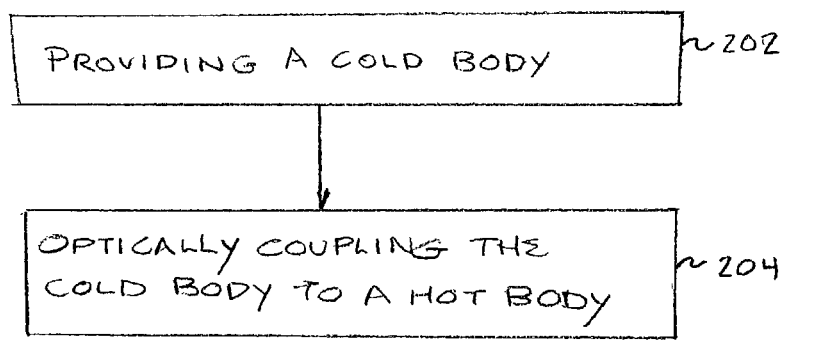
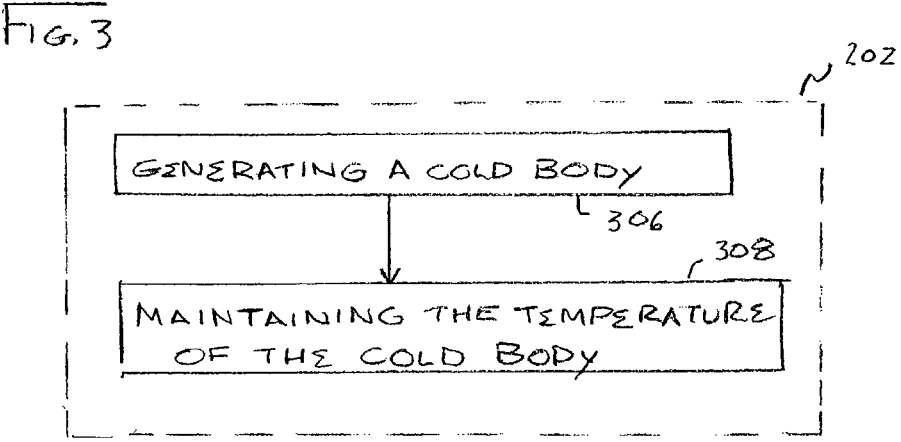

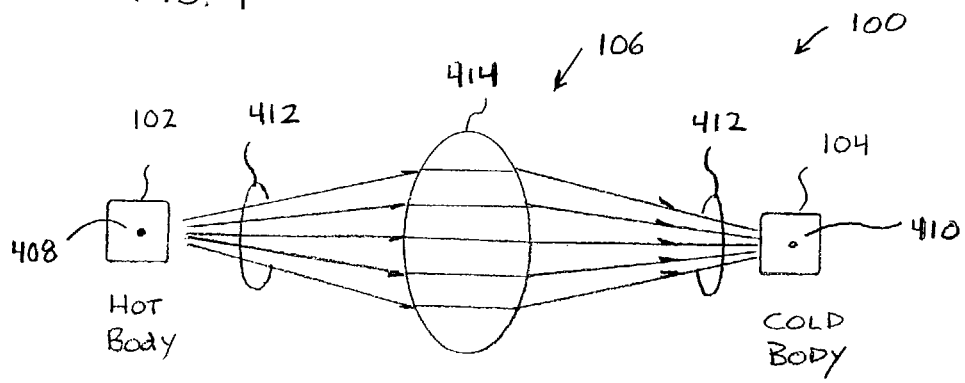
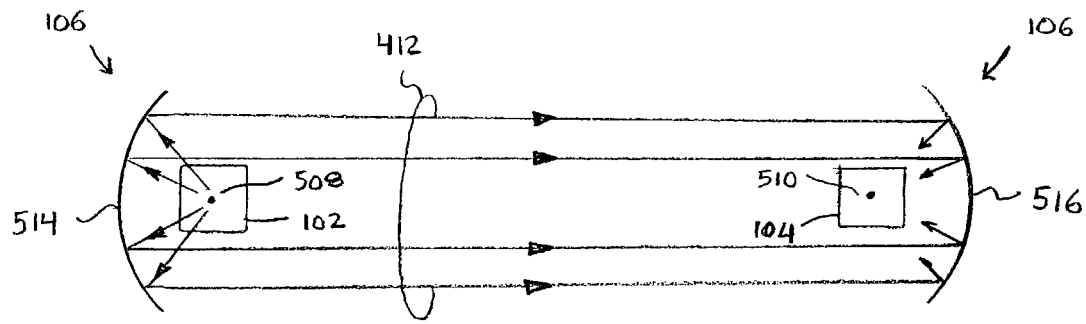
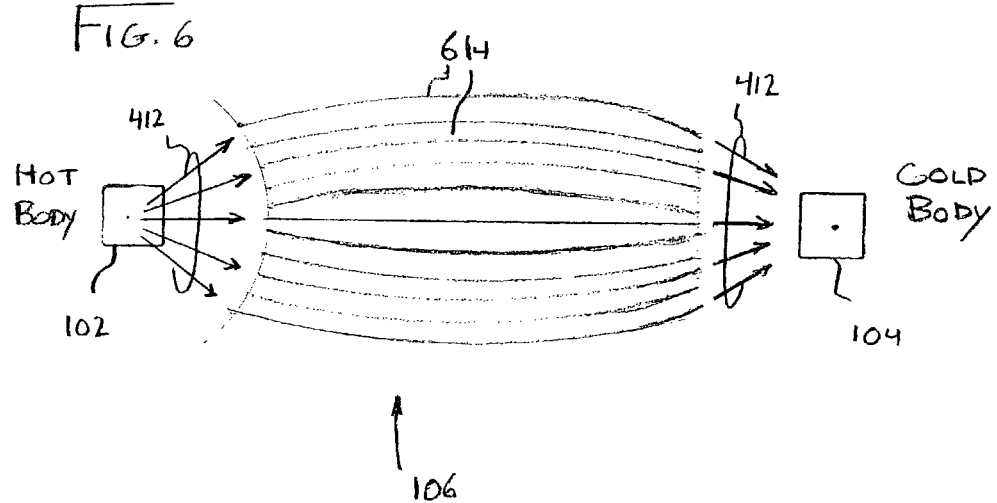

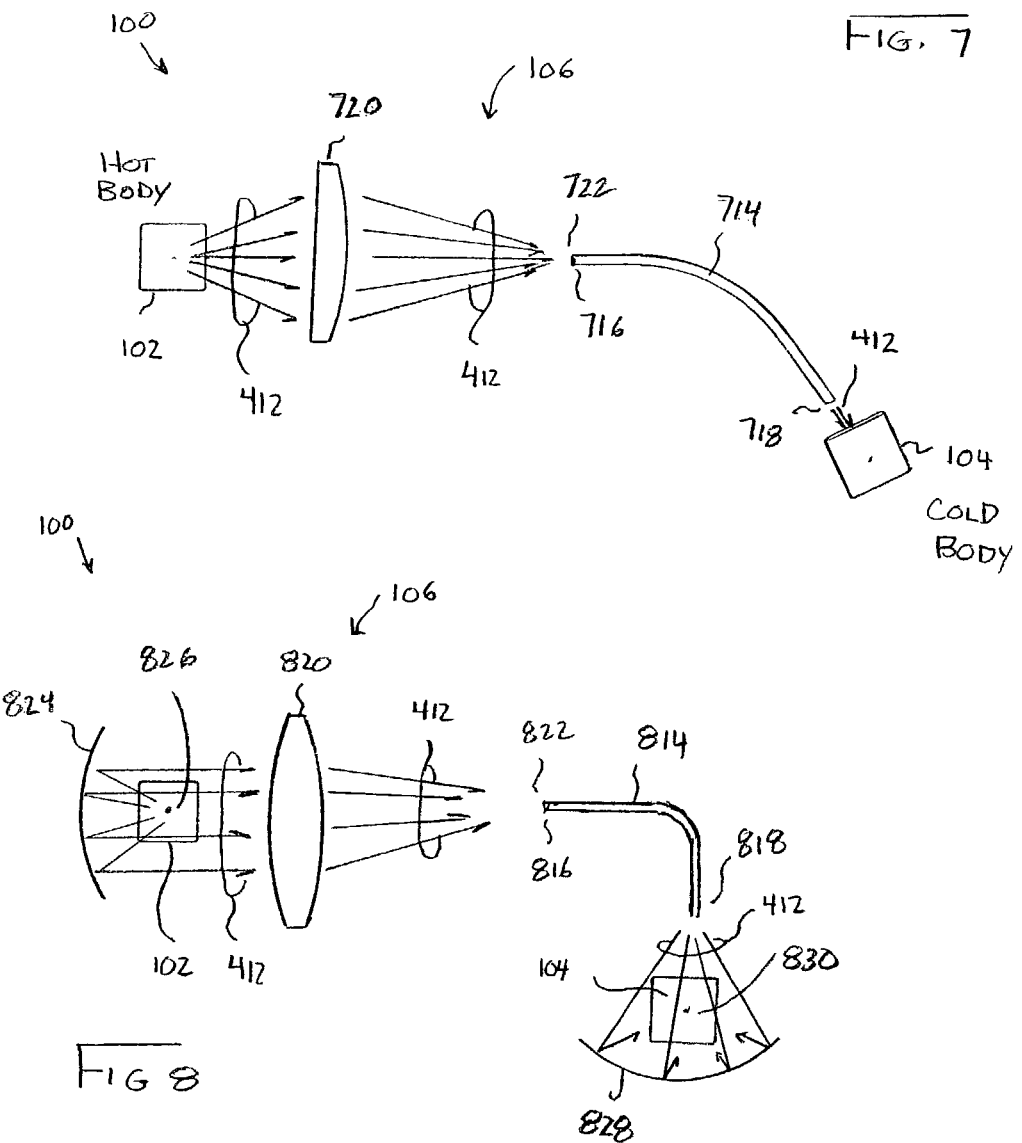
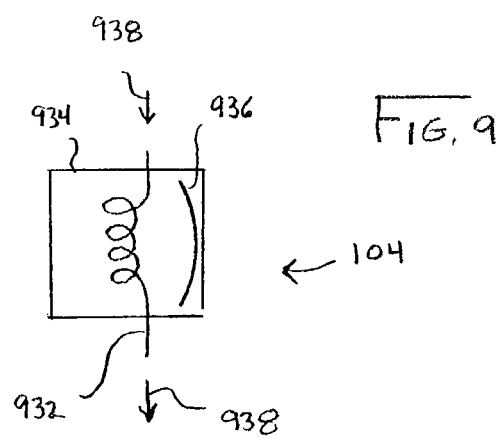

METHOD AND APPARATUS FOR OPTICALLY-ENHANCED COOLING

FIELD OF THE INVENTION

The present invention relates to removing heat from systems (e.g., electrical devices, circuits, chemical systems, living tissue, etc.).

BACKGROUND OF THE DISCLOSURE

Efficient and effective removal of heat from a system (e.g., circuit, process, etc.) is often of crucial importance for its proper functioning and continued operation.

The need for heat removal arises in a wide variety of technologies and processes across many different industries. Consider, for instance, the electronics industry. It is essential to remove the heat that is generated in digital and analog circuits (e.g., at P–N junctions, at resistors, etc.). The importance of removing heat from the ubiquitous microprocessor, for example, is hard to overestimate. Removing heat from a microprocessor that is part of an integrated circuit is necessary for proper functioning of the microprocessor and the circuit, as well as to support increases in circuit density and operating speed. Furthermore, removing heat from electronic components reduces the internal noise of those components, therefore increasing the sensitivity of devices (e.g., sensors, etc.) that contain them. Also, heat removal can increase circuit/device reliability due to a decrease in thermal stresses.

Heat removal is also important in the chemical and pharmaceutical industries. Many of the systems used in these industries involve exothermic (heat-generating) reactions. Furthermore, biological, medical and related areas dealing with in vivo (i.e., within the body) research and technology applications require heat removal from tissues, cells, biological fluids, and the like. And heat removal is also important for the continued development of the burgeoning "small tech" fields, such as micro-fluidics, MEMS and Nanotechnology. A literally unlimited number of further examples of the importance of heat removal can be found in industries as diverse as the machine tool industry, telecommunications, the military, and food processing industry.

It is relatively inefficient to remove heat by known techniques. This low efficiency (i.e., about 20 to 30 percent) is due, in large part, to an inability to remove heat from the location or "spot in space" at which the heat is actually generated. This problem often arises due to the inaccessibility of the hot spot. As a consequence, heat is often removed over a much larger area, requiring relatively larger cooling elements and a relatively greater amount of energy. Another reason for the relatively low efficiency is the prevalence of thermal exchanges due to conduction and convection.

Various techniques are employed to accelerate the three basic mechanisms of heat exchange, as a function of the specific application. Exemplary techniques include, for convection: forced air, water, heat pipes, etc.; for conduction: heat sinking, Peltier elements, etc.); and for radiation: special coatings and attention to system geometry.

These methods are restricted in their applicability due to energy requirements, size limitations, the incidence of contamination, and other constraints. Especially problematic is the continuing trend toward miniaturization, which presents substantial challenges for known heat removal systems and techniques. Consequently, a need remains for improved cooling techniques that are broadly applicable and easily size-scalable.

SUMMARY OF THE DISCLOSURE

The illustrative embodiment of the present invention is an apparatus and method that is capable of non-contact cooling of a hot body. The illustrative embodiment of the present invention avoids at least some of the drawbacks of prior art cooling systems.

An apparatus in accordance with the illustrative embodiment includes a cold body and an optical system. In various embodiments, the optical system includes free-space optics, guided optics, or a combination of both. The optical system couples the cold body to a hot body for enhanced transmission of infrared radiation. Once optically coupled, heat will flow in an enhanced manner from the hot body to the cold body, as dictated by thermodynamics, thereby cooling the hot body. In some embodiment, the temperature of the cold body is held substantially constant.

In a method in accordance with the illustrative embodiment of the present invention, a cold body is provided and the cold body is optically coupled to a hot body. Further description of the illustrative apparatus and method, and variations thereof, is provided by way of the Drawings and the following Detailed Description.

BRIEF DESCRIPTION OF THE DRAWINGS

FIG. 1 depicts an apparatus in accordance with the illustrative embodiment of the invention.

FIG. 2 depicts a method in accordance with the illustrative embodiment of the invention.

FIG. 3 depicts subtasks in the method of FIG. 2.

FIG. 4 depicts a first embodiment of an optical system for use in conjunction with the apparatus of FIG. 1, wherein the optical system is a free-space optical system.

FIG. 5 depicts a second embodiment of an optical system for use in conjunction with the apparatus of FIG. 1, wherein the optical system is a free-space optical system.

FIG. 6 depicts an embodiment of an optical system for use in conjunction with the apparatus of FIG. 1, wherein the optical system is a guided optical system.

FIG. 7 depicts a first embodiment of an optical system for use in conjunction with the apparatus of FIG. 1, wherein the optical system is a combined free-space, guided optical system.

FIG. 8 depicts a second embodiment of an optical system for use in conjunction with the apparatus of FIG. 1, wherein the optical system is a combined free-space, guided optical system.

FIG. 9 depicts an embodiment of a cold body for use in conjunction with the apparatus of FIG. 1 and the method of FIG. 2.

DETAILED DESCRIPTION

The terms and phrases listed below are defined for use in this specification as follows:

"Blackbody" is a hypothetical entity that absorbs all energy, reflects none and emits energy with perfect efficiency. A blackbody is assumed to satisfy the following ideal conditions:
1. A blackbody absorbs all incident radiation regardless of wavelength and direction.
2. For a prescribed temperature and wavelength, no surface can emit more energy than a blackbody.
3. Although the radiation emitted by a blackbody is a function of wavelength, it is independent of direction. A blackbody is defined as a diffuse emitter.

"Emissivity" is the ratio of emittance of a given object and a theoretical blackbody at the same temperature. Since a true blackbody is only a theoretical entity, "real" entities must have smaller emissive powers. The emissivity of a theoretical blackbody is defined as 1.0 and that of a perfect reflector is defined as 0.

Thus emissivity=1.0−reflectivity

In practice, emissivity is a function of both wavelength and temperature. For most practical applications, however, a single average value (which covers a selected range of wavelengths) is usually suitable for use.

"Infrared Radiation" or "IR" is a band of the electromagnetic spectrum extending from about $3 \times 10^{11}$ Hz to about $4 \times 10^{14}$ Hz. IR is often subdivided into four regions: the near (i.e., near visible) IR at wavelengths in the range of 780 to 3000 nanometers (nm); the intermediate IR at wavelengths in the range of 3000 to 6000 nm; the far IR at wavelengths in the range of 6000 to 15,000 nm; and the extreme IR at wavelengths in the range of 15,000 nm to 1 millimeter.

"Cold Body" is at a relatively lower temperature than a "Hot Body." Cold Body refers to an object, fluid, or a region of space.

"Hot Body" is at a relatively higher temperature than a "Cold Body." Hot body refers to an object, fluid, or a region of space.

"Optically couple" or "optically coupling" means establishing an optical path between two entities (i.e., a hot body and a cold body) that supports and enhances the transmission of infrared radiation between those two entities. Infrared radiation is transmitted over the path in preference to any non specific paths (e.g., via non-directed radiation).

A variety of geometrical optics concepts are referenced in this specification. If any issues arise as to interpretation of these concepts, *Optics*, by Eugene Hecht (3d ed., Addison Wesley Longman, Inc, 1998) is to be used as a reference.

FIG. 1 depicts apparatus 100 in accordance with the illustrative embodiment of the present invention. Apparatus 100 includes hot body 102, cold body 104, and optical system 106.

Hot body 102 (e.g., an electronic component, a substance in which an exothermic reaction is taking place, etc.) generates heat or is otherwise heated as a direct or indirect consequence of an action that is being taking (e.g., temperature increases as an object is being illuminated by laser light, etc.). Cold body 104 is cooler than hot body 102 and is therefore capable of receiving heat from hot body 102.

Optical system 106 optically couples hot body 102 to cold body 104 to support and enhance the transmission of infrared radiation. Once optically coupled in this fashion, heat will flow from hot body 102 to cold body 104 as dictated by thermodynamics. The flow of heat is proportional to the energy difference between hot spot 102 and cold spot 104.

A method 200 in accordance with the illustrative embodiment of the present invention is depicted in FIG. 2. In accordance with task 202 of method 200, a cold body is provided. The cold body is optically coupled to a hot body, as per task 204.

As defined above, the term "optically coupled" means that an optical path is established between hot body 102 and cold body 104 that supports and enhances the transmission of infrared radiation. The optical path is established, for example, by a free-space optics system, an integrated optics system, or a combined free-space/integrated-optics systems. In some embodiments, there is no physical contact between hot body 102 and any portion of optical system 106.

Those skilled in the art will recognize that the optics elements that compose optical system 106 must be specifically selected for the transmission/reflection of infrared wavelengths, since not all materials that are commonly used for optics elements will be suitable. Description of several embodiments of optical system 106 is provided later in this specification.

As depicted in FIG. 3, in some embodiments, task 202 of method 200 includes subtask 306, "generating a cold body." In some embodiments, subtask 306 is implemented by supplying liquid nitrogen to a selected location. In some embodiments, task 202 includes, in addition to subtask 306, subtask 308, which requires maintaining the cold body at a substantially constant temperature. In some embodiments, subtask 308 is implemented by establishing a constant flow 938 of liquid nitrogen through a coil 932, see, e.g., FIG. 9. In some embodiments, coil 932 is contained in IR-transparent material 934, such as germanium, etc. (see, partial list below). In the illustrative embodiment depicted in FIG. 9, curved mirror 936 is disposed within IR transparent material 934, with coil 932 disposed at the focal point of mirror 936. In other embodiments, curved mirror 936 is disposed outside of IR transparent material 934.

It will be understood that both hot body 102 and cold body 104 radiate heat (all objects having a temperature greater than absolute zero radiate heat). Consequently, heat "flows" in both directions (i.e., from hot body 102 to cold body 104 and from cold body 104 to hot body 102). The flow from "hot to cold" refers to the net flow of energy.

It will be apparent that apparatus 100 and method 200, as described above, enable and enhance the flow of IR from hot body 102 to cold body 104, forcing the hot body to cool. The illustrative apparatus and method can be thus be thought of as a "radiated cooling," wherein "cold" is generated by cold body 104 and "transmitted" by optical system 106 to hot body 102. In other words, apparatus 100 and method 200 provide a way to "shine" or "focus" cold on to hot body 102. It is understood, of course, that this is not accurate, since the net flow of heat is from hot to cold.

In view of the present disclosure, it will be appreciated by those skilled in the art that a wide variety of optical systems 106 can be devised to transmit IR from hot body 102 to cold body 104. Systems 106 included free-space optics systems, integrated-optics systems, and hybrid systems that combine free-space and integrated optics components.

FIGS. 4 and 5 depict illustrative embodiments of apparatus 100 having optical system 106 that use free-space optics to "shine" cold on hot body 102. FIG. 6 depicts an embodiment of apparatus 100 having optical system 106 that uses guided optics to "shine" cold on hot body 102. And FIGS. 7 and 8 depict illustrative embodiments wherein optical system 106 is a combined free-space and guided optical system.

Referring now to FIG. 4, optical system 106 includes spherical lens 414. Hot body 102 is disposed at first focal point 408 of lens 414 and cold body 104 is disposed at second focal point 410 of lens 414. In this embodiment, hot body 102 and cold body 104 are conjugate points. Infrared radiation 412 that is emitted from hot body 102 is imaged by lens 414 to cold body 104 at second focal point 410. As a consequence, hot body 102 will cool.

In the embodiment depicted in FIG. 5, optical system 106 includes curved mirrors 514 and 516. The mirrors can be, for example, hyperboloidal, ellipsoidal, paraboloidal, or spherical. Hot body 102 is at focal point 508 of mirror 514 and cold body 104 is at focal point 510 of mirror 516. Some infrared radiation 412 that is emitted from hot body 102 is captured by mirror 514, directed to mirror 516, and focused at cold body 104 at focal point 510.

It is will be recognized that typically only a small portion of hot body 102 or cold body 104 will be disposed at a focal point of a mirror or lens. When used to describe the position of a hot body or cold body relative to a focal point, the term "at" means "at or near." Given a mirror or lens that is intended to direct infrared radiation to its focal point, the further away that a cold body, for example, is from that point, the less infrared radiation the cold body receives.

FIG. 6 depicts an embodiment in which optical system 106 is a guided optical system. Optical system 106 includes waveguides 614, such as optical fibers, which are positioned to receive infrared radiation 412 that is emitted from hot body 102 and deliver it to cold body 104. In some embodiments, waveguides 614 are positioned so that the ends thereof nearest hot body 102 fall along a curve that approximates the wave front of the emitted infrared radiation. Positioning waveguides 614 in this fashion increases the portion of emitted infrared radiation 412 that is within the acceptance angle of waveguides 614.

FIG. 6 depicts one example of a guided optics system; in some other embodiments, surface waveguides (i.e., integrated optics systems) are used.

FIG. 7 depicts an embodiment in which optical system 106 is a combined free-space and guided optics system. In this embodiment, optical system 106 includes planar convex lens 720 and waveguide 714. Lens 720 receives infrared radiation 412 that is emitted from hot body 102 and focuses it focal point 722. End 716 of waveguide 714 is disposed at focal point 722. Infrared radiation 412 is coupled into waveguide 714 and propagates to end 718, which is near cold body 104. Some infrared radiation 412 that leaves waveguide 714 at end 718 is absorbed by cold body 104. Proper positioning, as is within those skilled in the art, of end 718 of waveguide 714 relative to cold body 104 maximizes that amount of radiation that is received by the cold body.

FIG. 8 depicts another embodiment in which optical system 106 is a combined free-space and guided optics system. In this embodiment, optical system 106 includes curved mirrors 824 and 828, bi-convex lens 820 and waveguide 814. Hot body 102 is disposed at focal point 826 of curved mirror 824 and cold body 104 is disposed at focal point 830 of curved mirror 828. Infrared radiation 412 that is emitted from hot body 102 is reflected to lens 820. Infrared radiation 412 that is received by lens 820 is focused at focal point 822. End 816 of waveguide 814 is disposed at focal point 822. Infrared radiation 412 is coupled into waveguide 814 and propagates to end 818. Infrared radiation 412 from waveguide 814 is received by curved mirror 828 and reflected to focal point 830 and cold body 104, which is located at focal point 830.

It will be apparent that a virtually unlimited number of optical systems 106 can be devised employing free-space, guided, or combined free-space and guided optics. See, Hecht, *Optics*, Chapters 5 and 6, (3d. ed., Addison Wesley Longman, 1998), incorporated by reference herein.

To optically couple cold body 104 to hot body 102, optical system 106 (i.e., the lenses, mirrors and waveguides) must be suitable for use with infrared radiation. That is, the lenses should be made of a material that is transparent to infrared radiation, the reflecting surface of the mirror is advantageously made of a material that strongly reflects infrared radiation and waveguides must be made of a material that is suitable for propagating infrared radiation.

There are a variety of chemically and mechanically stable materials that are IR transparent and that can be used to make lenses. Among those materials that are IR transparent, at at least some infrared wavelengths, are certain semiconductors, including, without limitation, silicon and germanium, chalcogenide glass, diamond, salts (e.g., potassium bromide and sodium chloride, etc.), fluorides (e.g., lithium fluoride, magnesium fluoride, etc.), silver halides (e.g., AgCl, etc.). Suitable lenses are commercially available from a variety of sources.

Fibers for transmitting infrared radiation include, without limitation, polycrystalline fiber and chalcogenide glass fiber that is available from ART-Photonics of Berlin, Germany. The polycrystalline fiber, which is suitable for IR wavelengths from about 4 to 18 microns, is formed from AgCl AgBr solid solution crystals. The chalgonide galss fiber, which is suitable for IR wavelengths from about 2 to 6 microns, is a mixture of germanium, selenium and typically either arsenic or antimony.

A variety of materials are known as being suitable for reflecting infrared radiation and can be used to form the reflective surface of mirrors used in optical system 106. Typical materials include, without limitation, gold, polished brass and polished bronze.

As previously indicated, hot body 102 can be electrical and electronic (i.e., semiconductor-based) circuits and components and chemical processes. Hot body 102 can be tissue, cells or other structures from organisms (i.e., animals, plants, fungi, prokaryotes, and protoctists). Hot body 102 can be minerals, crystals, and the like. More generally, hot body 102 is anything that needs to be cooled. Some applications for apparatus 100 and method 200 include:

cooling electronic components in integrated circuits;
creating a reflux in a vessel in which a reaction is taking place (by "shining" cold into the throat of the vessel to condense vapors);
cooling a crystal that heats up due to exposure to X-rays during X-ray crystallography; and
cooling an animal cell that is being exposed to radiation.

It will be understood that the design of optical system 106 will vary as a function of the nature of hot body 102. For example, if hot body 102 is a microprocessor in an integrated circuit, optical system 106 will typically include very small elements (e.g., lenses, mirrors, etc.). Such elements are readily fabricated and can be incorporated onto the substrate near the microprocessor, etc. In view of the present teachings, those skilled in the art will be able to design and implement optical system 106 to construct apparatus 100 and practice method 200, in accordance with the illustrative embodiment of the present invention.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

I claim:

1. A method comprising:
thermally coupling a hot body and a cold body by forming an optical pathway therebetween; and
forming the optical pathway:
(i) by providing an optical system having at least one physical adaptation that enables the optical system to support transmission of infrared radiation and to enhance the transmission of infrared radiation relative to an amount of infrared radiation that would otherwise be transmitted in the absence of the optical system; and
(ii) arranging the optical system so that the hot body is at a first focal point of the optical system and the cold body is at a second focal point of the optical system.

2. The method of claim 1 and further wherein the physical adaptation comprises the use in the optical system of a material selected from the group consisting of materials that are substantially transparent to infrared radiation, materials that reflect infrared radiation, and materials that support propagation of infrared radiation.

3. The method of claim 1 and further comprising holding a temperature of the cold body substantially constant.

4. The method of claim 1 wherein the hot body is selected from the group consisting of heat-generating electronic components, a vapor in a vessel, a crystal, and an animal cell.

5. A method comprising:
providing a relatively cooler region having a first temperature;
optically coupling a relatively warmer region, having a second temperature and which is disposed at a focal point of a lens or mirror of a free-space optical system, to said relatively cooler region; and
actively cooling the relatively cooler region so that the second temperature decreases more than the first temperature increases as a consequence of said coupling.

6. The method of claim 5 wherein the relatively cooler region is at a second focal point of the free space optical system.

7. The method of claim 5 wherein the hot body is selected from the group consisting of heat-generating electronic components, a vapor in a vessel, a crystal, and an animal cell.

8. A method comprising:
providing a relatively cooler region having a first temperature;
optically coupling a relatively warmer region having a second temperature to said relatively cooler region by coupling radiated infrared radiation from the relatively warmer region into a waveguide of a guided optical system; and
actively cooling the relatively cooler region so that the second temperature decreases more than the first temperature increases as a consequence of said coupling.

9. The method of claim 8 wherein optically coupling comprises arranging the waveguide so that it delivers infrared radiation to said relatively cooler region.

10. The method of claim 8 wherein the hot body is selected from the group consisting of heat-generating electronic components, a vapor in a vessel, a crystal, and an animal cell.

11. A method comprising:
providing a relatively cooler region having a first temperature;
optically coupling a relatively warmer region having a second temperature to said relatively cooler region by arranging a combination free-space and guided optical system so that the relatively warmer region is at a focal point of a lens or mirror of the combination free-space and guided optical system; and
actively cooling the relatively cooler region so that the second temperature decreases more than the first temperature increases as a consequence of said coupling.

12. The method of claim 11 wherein the hot body is selected from the group consisting of heat-generating electronic components, a vapor in a vessel, a crystal, and an animal cell.

13. A method comprising:
providing a relatively cooler region having a first temperature;
optically coupling, by positioning a waveguide at a focal point of a lens or mirror in a combination free-space and guided optical system, a relatively warmer region having a second temperature to said relatively cooler region; and
actively cooling the relatively cooler region so that the second temperature decreases more than the first temperature increases as a consequence of said coupling.

14. The method of claim 13 wherein the hot body is selected from the group consisting of heat-generating electronic components, a vapor in a vessel, a crystal, and an animal cell.

15. A method comprising:
providing a relatively cooler region having a first temperature;
optically coupling a relatively warmer region having a second temperature to said relatively cooler region by delivering infrared radiation from a waveguide of a guided optical system to said relatively cooler region; and
actively cooling the relatively cooler region so that the second temperature decreases more than the first temperature increases as a consequence of said coupling.

16. The method of claim 15 wherein the hot body is selected from the group consisting of heat-generating electronic components, a vapor in a vessel, a crystal, and an animal cell.

17. A method comprising:
optically coupling a hot body and a cold body via an optical system, wherein:
(i) the hot body is sited at a first focal point of the optical system;
(ii) the cold body is sited at a second focal point of the optical system;
(iii) the first focal point and the second focal point are physically remote from one another; and
(iv) the operation of optically coupling results in the transmission of more energy at infrared wavelengths between the hot body and the cold body than when they are not optically coupled, thereby increasing the extent to which the hot body is cooled; and
maintaining a temperature of the cold body substantially constant so that the temperature of the hot body decreases more than the temperature of the cold body increases.

18. The method of claim 17 wherein the hot body is selected from the group consisting of heat-generating electronic components, a vapor in a vessel, a crystal, and an animal cell.

* * * * *